Patented Feb. 15, 1927.

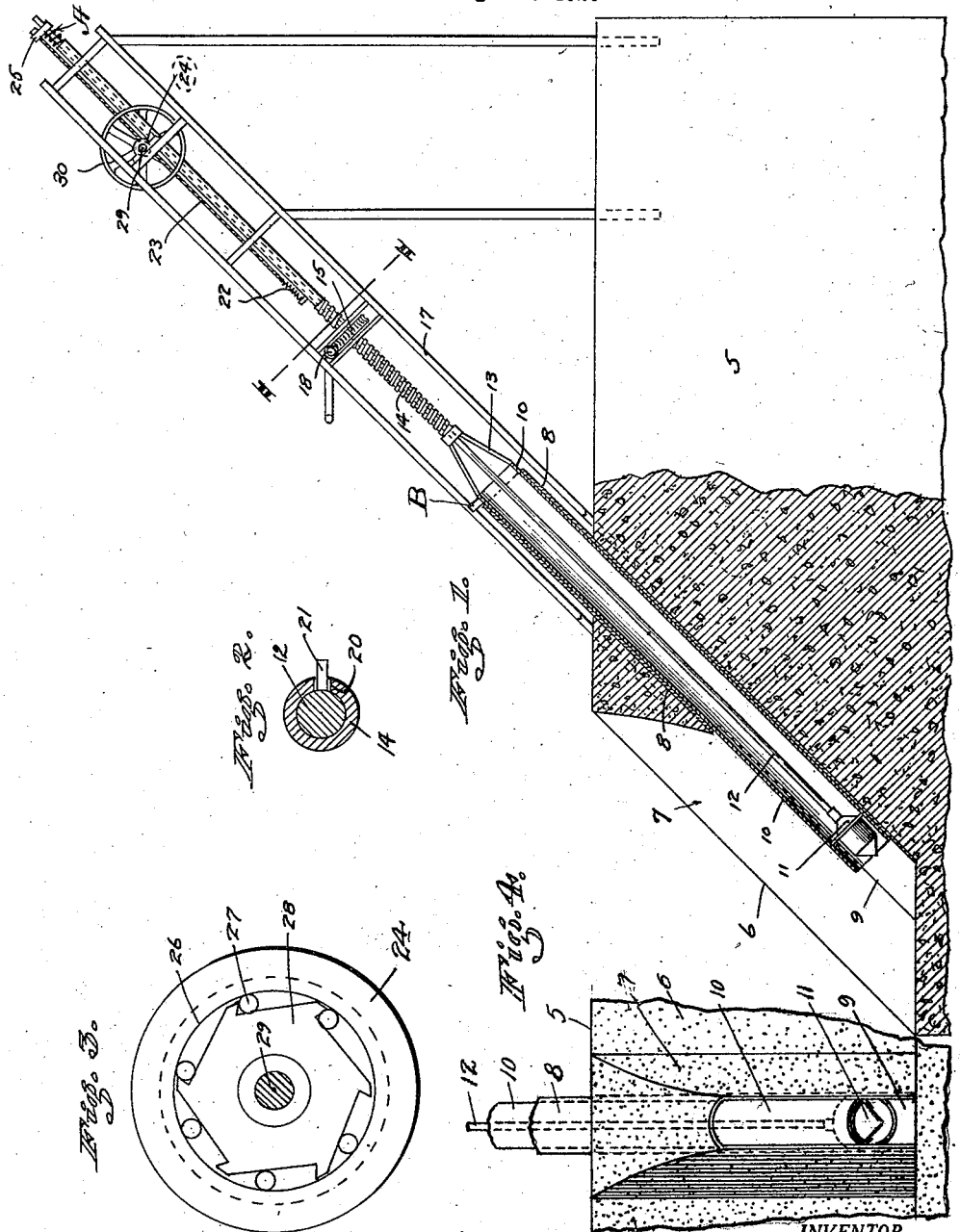

1,617,571

UNITED STATES PATENT OFFICE.

SAMUEL B. CALDWELL, OF OAKLAND, CALIFORNIA.

WAVE MOTOR.

Application filed August 27, 1923. Serial No. 659,638.

This invention relates to wave motors and has for its primary object the provision of a motor of this character embodying novel means adapted to be actuated by impact of a wave and by the supplemental action of the water to seek its level or in other words to ride on the crest of the wave and convey motion to a power transmitting means whereby the power generated may be used for commercial purposes.

Another object of the invention is to provide a motor of this character which is simple of construction, reliable of action and which will be entirely automatic to compensate itself to the action of the waves.

Another object of the invention is to provide a motor of this character which can be effectively installed in a sea wall where it will be positively subjected to the action of the waves and at the same time concealed in a manner which will prevent damage to the parts by ships or objects coming in contact with said sea wall.

A still further object of the invention is to provide a motor of this character which can be embodied in the construction of a sea wall of customary form.

My invention, therefore, comprises certain new features of construction and arrangement and combination of elements hereinafter set forth and pointed out in the claims annexed hereto.

In the drawings:

Figure 1 is a view partly in elevation and partly in section of the motor.

Figure 2 is a horizontal section on the line 2—2 of Figure 1.

Figure 3 is a vertical section through the power transferring shaft on an enlarged scale.

Figure 4 is a face view of the wall and duct on a reduced scale.

In carrying the invention into practice use is made of a sea wall (5) having an inclined face (6) formed with a water inlet duct (7) which opens to the sea. In the sea wall is a stationary casing (8) open at its front face at (9) to communicate with the duct (7). Mounted for sliding adjustment in the stationary casing (8) is a cylindrical casing (10), the same being open at both ends and provided with a reciprocatory float or buoyant body (11) to which a rod (12) is connected. The movable casing (10) is provided with a yoke (13) which carries a worm screw (14). This screw operates in a worm gear (15) swiveled in a frame (17). Intermeshing with the worm gear (15) is an actuating screw (18) which can be turned manually or in any suitable well known manner so as to establish co-action between the screw (14) and the gear (15) to cause the sliding cylinder (10) to be adjusted in the fixed cylinder (8). By means of this construction the said sliding cylinder can be adjusted where the float (11) will be subjected to the effective action of the water on the rise and fall thereof.

The worm screw (14) is provided with a bore (19) and a lateral communicating slot (20). The rod (12) of the float (11) moves through the bore (19) and said rod is formed with a lug (21) which moves in the slot (20). Connected with this lug is a spring (22) of a draft cable (23). This cable is passed around a sheave (24) suitably journaled in the frame (17) and the opposite end of said cable is fixedly connected at (25) with the upper end of said rod (12). The sheave (24) is provided with a clutch surface (26) and coacting therewith are rollers or clutch bodies (27) which are associated with a clutch element (28) on the shaft (29) of said sheave. In this manner it will be seen that when the float (11) rises in its cylinder (10) the cable (23) will function as respects the sheave (24) so as to cause an interlocking engagement between the clutch elements (26) and (28) and thereby place the shaft (29) in motion. Retrograde rotation of this shaft is prevented through action of said clutch elements on a downward movement of said float. It shall be understood that this downward movement of the float is encouraged by the action of gravity influenced by the weight of the rod (12).

In operation it shall be assumed that there is a determined level of sea water and that the movable cylinder (10) has been adjusted in accordance with this known level, whereby to subject the float (11) to the action of the waves as they strike against the sea wall and enter the duct (7). Under the impact of the waves, supplemented with the action of the float to rise upon the crest of the waves, motion in an upward direction is imparted to the float, which in turn, is taken into the shaft (29) where it can be transferred by means of a pulley (30) to mechanism such as an electric generator to be driven thereby.

I claim:

1. A wave motor comprising a sea wall having a duct facing seaward and further having a sloped passage connecting with the duct and opening through the upper side of the wall, a rigid support connected to the sea wall, an open ended cylinder slidably fitted in the sloped passage and coaxial therewith, a tubular member permanently connected at one end to the upper end of the cylinder and slidably connected to the support, the said tubular member having one end portion thereof provided with a longitudinal slot and its opposite end portion screw threaded, a worm gear and pinion connected to the support and disposed for operating upon the screw threaded portion of the tubular member to move the same axially whereby the lower end of the cylinder is adjustable with relation to the duct, a float in the cylinder, a float arm extending loosely through the tubular member and having a lateral extension disposed in the slot thereof, a power transmitting device connected to the support and a connection including a clutch between the said transmitting mechanism and the extension of the float arm.

2. A motor of the class described comprising in combination with a sea wall having a face inclined downwardly and seaward and provided with a duct extending throughout the distance from top to bottom of the face, a slidably mounted open ended tube extending through the wall and into said duct so that its lower end may be variably positioned with respect to the lower end of the duct, a reciprocating float mounted to operate in said tube and cooperating with the lower open end thereof and power transmitting means connected with said float.

SAMUEL B. CALDWELL.